UNITED STATES PATENT OFFICE.

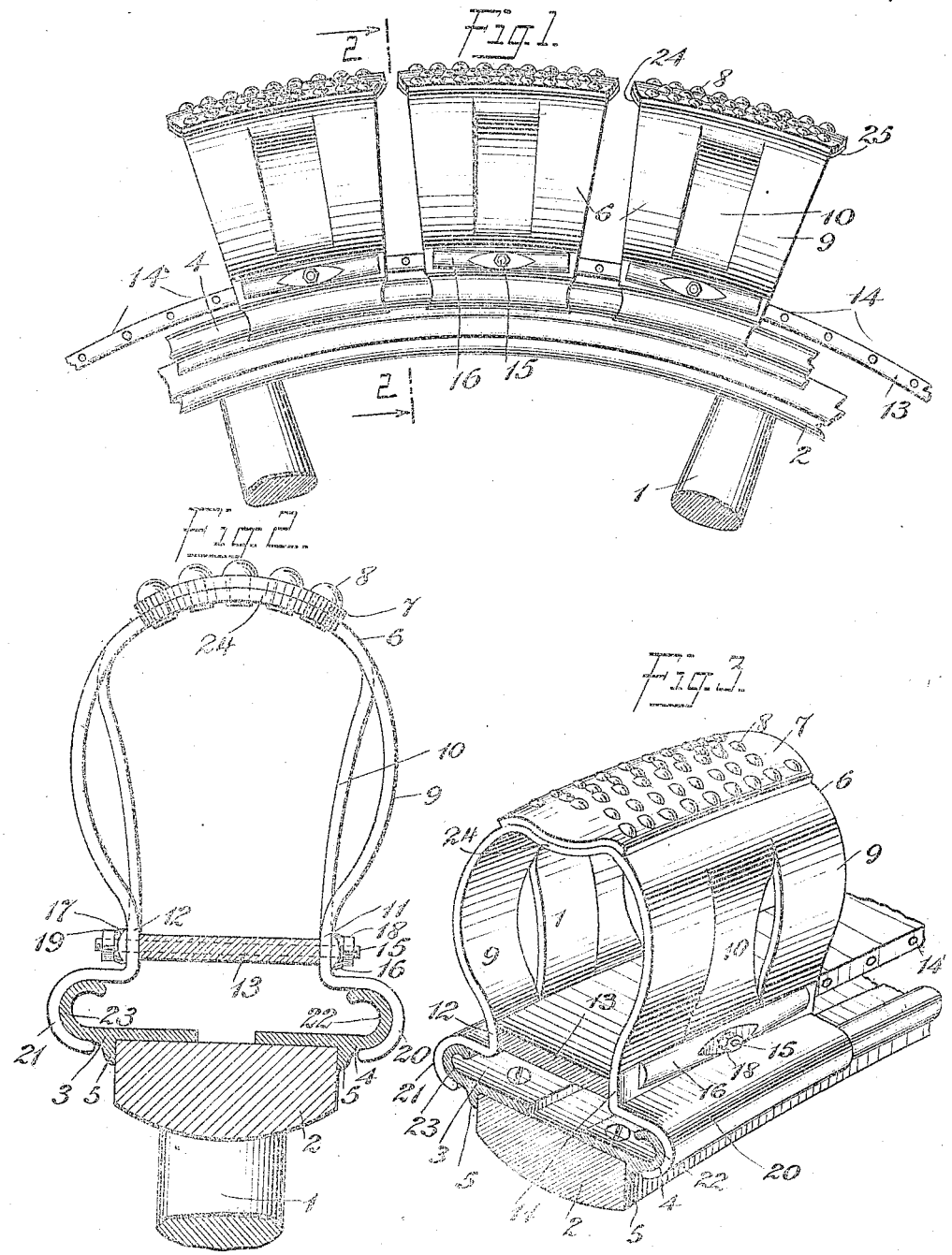

SEBASTIAN PHILIP NEUHAUSEN, OF CHICAGO, ILLINOIS, ASSIGNOR OF FORTY-NINE ONE-HUNDREDTHS TO ALFRED DORIA, OF NEW YORK, N. Y.

RESILIENT TIRE.

1,137,518.  Specification of Letters Patent.  Patented Apr. 27, 1915.

Application filed February 21, 1914. Serial No. 820,209.

*To all whom it may concern:*

Be it known that I, SEBASTIAN P. NEUHAUSEN, a citizen of the United States, and a resident of Chicago, in the county of Cook and State of Illinois, have invented a new and Improved Resilient Tire, of which the following is a full, clear, and exact description.

This invention relates to improvement in shoes or tires for wheels, and has for an object to provide an improved resilient shoe or tire for automobile wheels and the like.

Another object of the invention is to provide a resilient shoe for automobile wheels wherein the shoe is formed with a substantially tubular body divided into sections, and the sections split so as to present resilient side members.

A still further object of the invention is to provide a metallic shoe or tire for automobile wheels wherein the resiliency is produced by dividing the sides of the tire into comparatively small parts so that the respective parts may act substantially independently.

In the accompanying drawings Figure 1 is a fragmentary side view of an automobile showing part of a tire arranged thereon; Fig. 2 is a section through Fig. 1 approximately on line 2—2; and Fig. 3 is a perspective view of part of the felly of the wheel and one of the sections of the tire.

Referring to the accompanying drawings by numeral, 1 indicates a wheel of any desired kind provided with a felly 2, in this instance of wood, though metal fellies could be used without departing from the spirit of the invention as the construction of the wheel is no part of the invention.

Mounted upon felly 2 is a rim formed of rings 3 and 4 which are held in place by any desired means, as for instance screws or bolts. It is of course evident that rings 3 and 4 could be made in one piece without departing from the spirit of the invention. In making these two members in one piece it is necessary to omit one of the lugs 5 in order to properly apply the rim. Mounted upon the rings 3 and 4 are a plurality of identically constructed sections 6 forming a shoe or tire for wheel 1 which sections are preferably placed a slight distance apart. Each of the sections 6 is constructed as shown in Figs. 2 and 3, wherein it will be observed that they are made substantially tubular, or rather substantially pear-shaped when looking at the end. The upper or tread half of the shoe 6 is substantially semi-circular, and is solid throughout so as to properly carry a tread strip 7 of resilient material, as for instance leather, rubber, fiber or other suitable material. The leather strip 7 is held in place by rivets 8 which have enlarged heads so as to act as anti-skidding projections. The section 6 is provided with a plurality of outwardly bowed portions 9, and a plurality of inwardly bowed portions 10 which allows a proper up and down movement of the tread members 7. The lower or inner part of the section 6 is provided with straight portions 11 and 12 between which is arranged what may be termed a floating or spacing ring 13 formed preferably of metal. This ring is provided with a plurality of openings 14 through which bolts 15 are passed, bolts 15 also passing through clamping washers 16 and 17 held in place by suitable nuts 18 and 19. This stiffens and braces the lower part of the section 6 and also connects all of the section 6 together. Also, the arrangement of the bolts 15 causes the turned-over or hooked portions 20 and 21 to encircle and clamp against the turned-over portions 22 and 23 of the rings 3 and 4.

As shown in Fig. 1, the upper or tread portion of each section is provided with overhanging extensions 24 and 25, but ample space is provided between the various sections. The tread strip 7 is designed to extend from one end of section 6 to the other, and also to cover the overhanging extensions 24 and 25. By forming an inwardly bowed portion 10 in each section 6 the ends of the sections are allowed independent resilient movement, whereby the various sections more nearly simulate the action of the ordinary pneumatic tire. It will also be noted that the sections are independent, and may be independently applied and removed when any of the sections become worn or damaged, or for any reason. In case one or even more sections are damaged while on the road these sections may be removed and the remaining sections adjusted, or more evenly distributed, and thereby provide a tire or shoe, whereby the machine may continue its journey. This will of course necessitate the provision of a number of additional apertures 14 besides those filled with the bolts 15.

What I claim is—

1. A tire of the class described, comprising a plurality of independent sections, each of said sections being formed substantially tubular in shape, and with a pressed-out center portion on each side, the sides of said pressed-out portions being severed from said sections whereby resilient side members are presented designed to bow or spring in opposite directions when the tread of the tire is moved.

2. A resilient tire for wheels, comprising a plurality of independent sections, and means for holding said sections in place on the wheel, each of said sections being formed of resilient metal having the sides slit and the portions between the slits pressed inwardly, whereby upon the compression of the tread of the tire the inwardly extending portions and the remaining part of the sides will bow in opposite directions.

3. A tire comprising a plurality of metallic sections formed with resilient sides and a tread, said resilient sides merging into hooked members, retaining members connected with the felly of the wheel engaging said hooked members for holding the various sections of the tire on said felly, means for clamping said hooked members to the retaining means connected with the felly, and a floating, bracing and stiffening ring for preventing said clamping means crushing said resilient sides.

In testimony whereof I have signed my name to this specification in the presence of two subscribing witnesses.

SEBASTIAN PHILIP NEUHAUSEN.

Witnesses:
  JAMES BLYLER,
  FRED J. BROWN.